June 30, 1959 H. MIRZWINSKI 2,892,937

PULSE SIGNAL SYSTEMS

Filed Nov. 25, 1955

INVENTOR:

Henryk Mirzwinski

BY: Baldwin & Wight

ATTORNEYS

United States Patent Office 2,892,937

Patented June 30, 1959

2,892,937

PULSE SIGNAL SYSTEMS

Henryk Mirzwinski, Chelmsford, England, assignor to Marconi's Wireless Telegraph Company Limited, London, England, a British company Application November 25, 1955, Serial No. 548,822

Claims priority, application Great Britain January 3, 1955

3 Claims. (Cl. 250—27)

Figure 1:
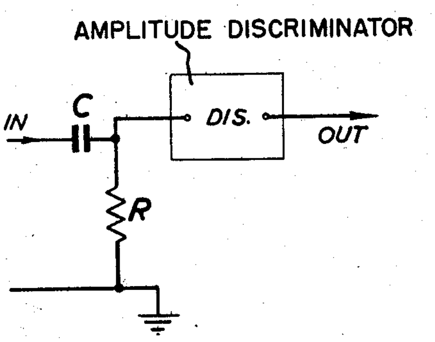

This invention relates to pulse signal systems i.e. to systems in which signal information is conveyed by electrical pulses and seeks to eliminate or reduce noise and other interference in such systems. There are numerous pulse signal systems, a well known example to which the invention is applicable with great advantage, being that of the common television systems in which synchronizing signals in the form of rectangular pulses are used for synchronizing the waveform at the receiver with the transmitted waveform.

The invention will be described in its application to television apparatus, but this is, of course, only one of its applications.

In one well known method of restoring a pre-determined datum value (usually black) of a composite television waveform by means of clamping pulses, these pulses are generated by a clamping pulse generator which is triggered by pulses derived from the synchronizing pulses by differentiating their lagging edge. However, if a negative-going noise pulse occurs during reception of positively modulated signals the differentiating circuit is likely to provide a clamping trigger pulse from the lagging edge of the noise pulse and thereby produce a false clamp. The effect of this is to clamp the picture signal to the datum level at the instant that the lagging edge of the noise pulse occurs, notwithstanding that the actual picture signal at that instant might be at peak white. Consequently the subsequent part of the line in which the noise pulse occurs will be represented by a waveform that is negative to the datum level i.e. it is "blacker than black" and the correct restoration to the required datum level will not occur until the next following correct clamping pulse.

If a positive going noise pulse occurs during the synchronizing signal of the composite waveform of a positively modulated picture signal its effect is to split the negative-going synchronizing pulse into two narrower pulses divided by the noise pulse. In this case a false clamping trigger pulse is likely to be produced by the leading edge of the noise pulse.

It is the object of the present invention to reduce or substantially to eliminate undesired effects due to the occurrence in a pulse transmission system of noise impulses liable to set in the same way as the desired pulses.

The invention takes advantage of the well known fact that noise pulses are, in general, of short duration. The invention can be applied in all cases where the desired pulses are substantially longer than noise pulses. In general, noise pulses do not exceed 2 microseconds duration and often are even shorter, whereas the duration of the synchronizing signals in current use for television purposes vary from 5 to 8 microseconds, depending of course on the particular system of transmission.

According to this invention undesired interfering pulses which are present in a train of desired pulses of minimum pre-determined length and are substantially less than said length are eliminated or substantially reduced by subjecting all the pulses to a differentiating circuit whose time constant is of the same order of length as said pre-determined length so as to produce from the leading edge of each pulse a signal excursion which reaches a maximum value quickly and then dies away relatively slowly and from the trailing edge of each pulse an oppositely sensed signal excursion which commences at the value to which the leading edge signal excursion has died away and then in turn dies away relatively slowly and then passing the resultant signals to a amplitude discriminator adjusted to discriminate between the different amplitudes of the signals due to the trailing edges of the derived pulses on the one hand and the signals due to the trailing edges of the shorter undesired pulses on the other.

Figure 2:
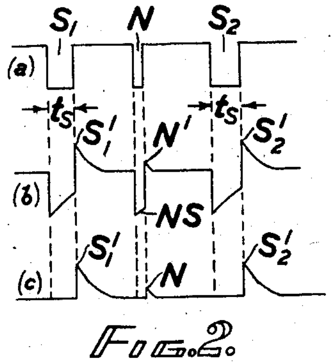
Figure 3:
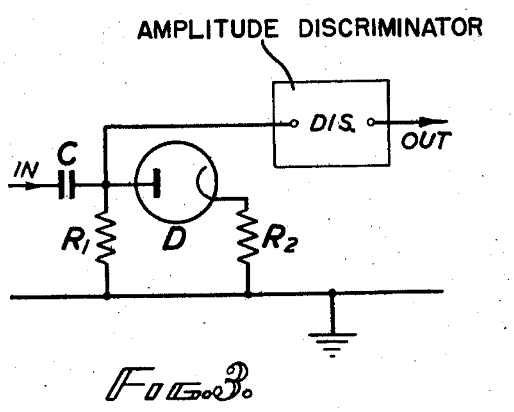
Figure 4:
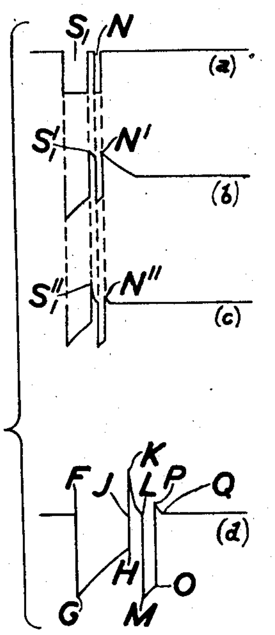

The invention is illustrated in and further explained with reference to the accompanying drawings of which Fig. 1 shows one embodiment diagrammaically; Fig. 2 illustrates voltage waveforms pertaining to the circuit of Fig. 1; Fig. 3 shows another embodiment providing a higher degree of noise discrimination than is sometimes obtainable with the circuit of Fig. 1; and Fig. 4 illustrates voltage waveforms relating to the circuit shown in Fig. 3.

Referring to Fig. 1 of the accompanying drawings, this shows a simple differentiating circuit consisting of a condenser C in series with a resistance R. The time constant of the differentiating circuit is, of course, determined by the product of the capacity into the resistance and is chosen to be approximately equal to the minimum duration of the desired pulses to be applied at In. Joined to the junction of C and R is an amplitude discriminator DIS of any well known type, and the output Out from the discriminator is the required output to be utilized, for example for triggering the clamping pulse generator (not shown) of a television apparatus.

In Fig. 2, the waveform shown at (*a*) shows two typical negative going line synchronizing signals $S_1$ and $S_2$ as commonly employed for television purposes. Superimposed on the waveform is a negative going noise pulse N intermediate the synchronizing signals. When the voltage waveform shown at (*a*) is applied at In in the circuit illustrated in Fig. 1, provided the time constant is made approximately equal to the duration time of the synchronizing signal as indicated in Fig. 2, the output from the differentiator network will have a waveform as shown at (*b*) of Fig. 2.

The choice of the time constant as described produces the result that after the leading or the lagging edge of a pulse has occurred, the resultant fall of voltage from the peak value is only gradual, though nevertheless the peak is sharp enough to operate a clamping trigger circuit satisfactorily. The effect of this gradual fall of voltage from the peak likewise ensures a gradual slope NS in the waveform of the noise pulse waveform following the leading edge. Consequently, the lagging edge of the noise pulse produces only a small peak N in the positive sense since the positive going voltage excursion due to said lagging edge starts from the substantial negative value determined by the end of the die-away portion NS. In Fig. 2 (*c*) are illustrated the waveforms of the positive pulses $S_1'$ and $S_2'$ developed by the synchronizing signals and also the positive pulse N' developed by the noise. It is obvious that the substantial difference in amplitudes between $S_1'$ and $S_2'$ on the one hand and N' on the other will enable satisfactory amplitude discrimination to be obtained, thereby providing a means for eliminating the effect of the interfering noise pulse. In Fig. 1 the required amplitude discriminator which may be of any well known form is represented schematically by the block DIS.

A higher degree of discrimination is obtained by the double circuit arrangement illustrated in Fig. 3. This circuit comprises a first differentiating network $CR_1$, and, connected across $R_1$, is a diode D and a resistance $R_2$ in series. The pulse input is applied in In and the output is fed to an amplitude discriminator DIS. Before considering the operation of this circuit, first consider the curves shown in Fig. 4. These waveforms relate to the operation of the circuit shown in Fig. 3. Curve (*a*) shows a desired pulse $S_1$ applied to condenser C and a noise pulse N occurring shortly after it. When a single differentiating circuit of the type shown in Fig. 1 is used, the output voltage waveform will be of the shape indicated at (*b*). It is seen that when the leading edge of the noise pulse arrives the differentiated voltage produced by the lagging edge of the synchronizing pulse still has a substantial positive value and consequently when the lagging edge of the noise pulse is differentiated the positive going pulse N′ has an amplitude which is almost equal to that of the synchronizing pulse S′. Amplitude discrimination under such conditions is impossible.

However, in the preferred arrangement of Fig. 3 the differentiating network is given a time constant that is substantially shorter to pulses of one sense than to pulses of the other so as to reduce the amplitude of the differentiated noise voltage relative to that of the synchronizing pulse. Consider the waveform shown at Fig. 4(*c*), and expanded at 4(*d*). The leading edge of the synchronizing pulse develops the negative pulse GH, and the lagging edge develops the positive spike JKL. At the instant of time approximately corresponding to J the anode of diode D becomes positive and the diode conducts to bring the resistance $R_2$ into parallel relationship with $R_1$. This lowers the time constant of the complete network and by suitable choice of resistance value for $R_2$ the result can be obtained that the spike at K is made to fall rapidly following the peak corresponding to the lagging edge of the synchronizing pulse. When the diode D is conductive, the time constant of the circuit becomes $$C\cdot\frac{R_1(Rd+R_2)}{R_1+Rd+R_2}$$

where RD is the resistance of the diode D and the other values are those of elements which are so referenced in Fig. 3.

From the peak at K, the voltage falls rapidly to the datum line at L thereby causing the leading edge LM of a negative going pulse to make the diode anode negative to point M and to render the diode non-conductive. This converts the effective time constant of the circuit to that of the simple differentiating network $CR_1$ and consequently the waveform of the noise pulse will be LMOP as in Fig. 4. There is a small positive spike at P developed by the noise pulse but this is of very small amplitude compared with that of the synchronizing signal.

In the practical operation of the invention, a limiter would normally be connected prior to the differentiator circuit so as to limit the amplitude of noise pulses to ensure that they do not exceed the amplitude of the desired pulses. The amplitude discriminator is of course so adjusted that only the lagging edge information derived from the desired pulses is passed to the following circuit (not shown).

Although the invention has been described in its application to television apparatus, it is clearly applicable to any system in which the intelligence is conveyed by pulses, and where it is required to improve the discrimination of wanted to unwanted signals in dependence upon the relative time duration of the respective signals.

I claim:

1. A pulse signal system wherein undesired interfering pulses which are present in a train of desired pulses of minimum predetermined length and are substantially less than said length are eliminated or substantially reduced by subjecting all the pulses to a differentiating circuit consisting of two coacting paths, one of said paths including a condenser and a resistance in series and having a time constant of the same order of length as said pre-determined length so as to produce from the leading edge of said pulse a signal excursion which reaches a maximum value quickly and then dies away relatively slowly, and from the trailing edge of each pulse an oppositely sensed signal excursion which commences at the value to which the leading edge signal excursion has died away and then in turn dies away relatively slowly, the other of said coacting paths comprising a circuit containing a rectifier device and a resistor connected in series, said last mentioned path being connected in shunt with the aforesaid resistance in said first mentioned path whereby the oppositely sensed signal excursion when passing through said last mentioned path reduces the time constant of said first mentioned path, an amplitude discriminator connected to the output of said differentiating circuit intermediate said coacting paths and adjusted to discriminate between the different amplitudes of the signals due to the trailing edges of the derived pulses on the one hand and the signals due to the trailing edges of the shorter undesired pulses on the other hand.

2. A pulse signal system as set forth in claim 1 in which the rectifier device is so connected that it is rendered non-conductive by the leading edge of a negative going pulse whereby the time constant of the differentiating circuit is substantially increased.

3. A pulse signal system as set forth in claim 1 in which an output circuit is connected with the output of said discriminator and wherein said discriminator is adjusted so that only the trailing edge information as derived from the desired pulses is passed to the output circuit.

References Cited in the file of this patent

UNITED STATES PATENTS

| | | |
|---|---|---|
| 2,355,363 | Christaldi | Aug. 8, 1944 |
| 2,466,959 | Moore | Apr. 12, 1949 |
| 2,493,353 | Kuperus | Jan. 3, 1950 |
| 2,522,551 | Williams | Sept. 19, 1950 |
| 2,582,251 | Hoeppner | Jan. 15, 1952 |
| 2,689,299 | Anderson | Sept. 14, 1954 |

FOREIGN PATENTS

| | | |
|---|---|---|
| 597,194 | Great Britain | Jan. 20, 1948 |